United States Patent Office 3,475,902
Patented Nov. 4, 1969

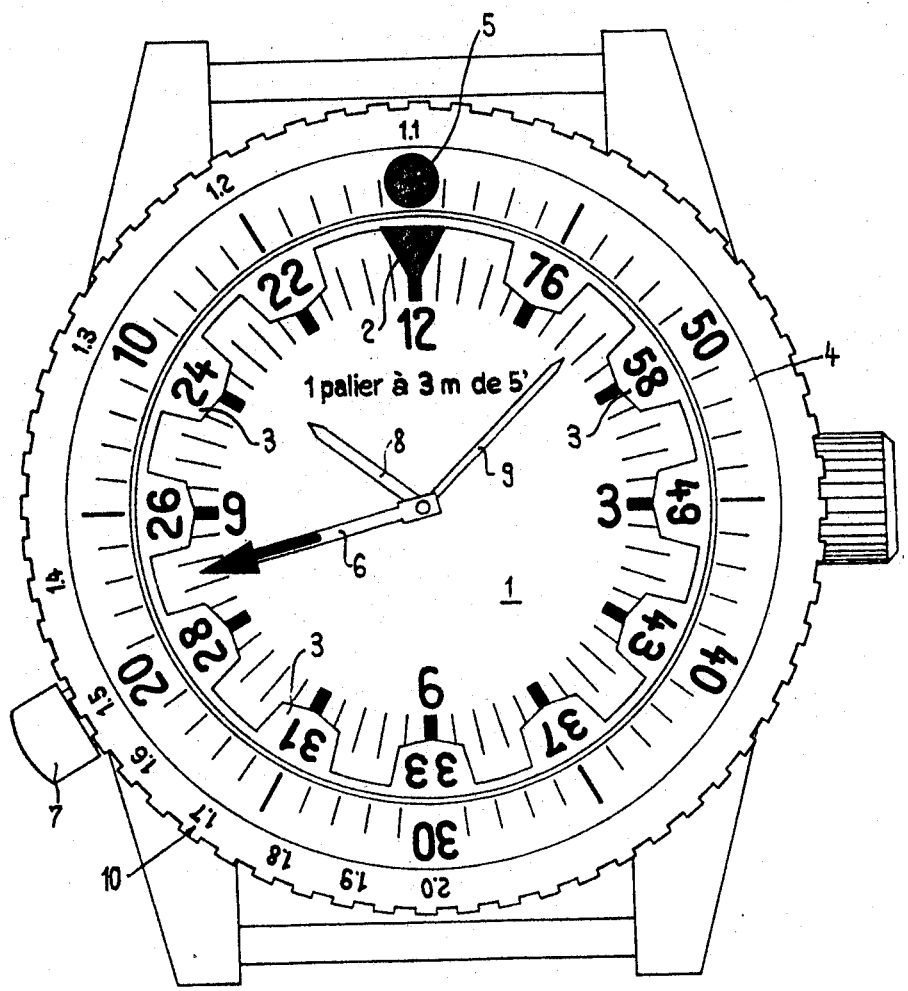

3,475,902
DIVER'S WATCH
Paul Wessel, Ronnerweg 1a, Nidau, Switzerland
Filed July 10, 1968, Ser. No. 743,743
Claims priority, application Switzerland, July 10, 1967,
9,812/67
Int. Cl. G04b 19/18
U.S. Cl. 58—126                                    4 Claims

ABSTRACT OF THE DISCLOSURE

A diver's watch, comprising on its periphery a set of numbers indicating the depth at which the diver can stay during a time corresponding to the position of each number, said time being proportional to the angle formed between the "noon" of the dial and said number, a bezel provided with an index, rotatably mounted on the watchcase, and a minute stop-hand, the whole being such that for a dive at a given depth, it suffices to turn the bezel so as to bring its index opposite the number indicating said depth and to start the minute stop-hand, the diver being warned that he has to go up again when said hand arrives opposite the index of the bezel.

---

The present invention relates to a diver's watch, comprising on its periphery a series of numbers indicating the depth at which the diver can stay during a time corresponding to the position of each number, which time is proportional to the angle formed between the "noon" of the dial and the said number, a bezel provided with an index, rotatably mounted on the case of the watch, and a minute stop-hand, the whole being arranged in such a way that for a dive at a given depth, it is sufficient to turn the bezel so as to bring its index opposite the number indicating the said depth and to start the minute stop-hand, the diver being warned that he has to go up again when the said hand arrives opposite the index of the bezel.

The accompanying drawing illustrates, by way of example, an embodiment of the invention.

The single figure is a plan view of said embodiment.

The diver's watch illustrated in the drawing comprises a dial 1 carrying, at "noon," a mark 2 and, on its periphery, a series of cartouches 3 containing numbers indicating the depth at which the diver can stay during a time corresponding to the position of each number, which time is proportional to the angle formed between the mark 2 of "noon" and the said number. The cartouches might also be placed on a tension ring for the crystal. Thus, in the example shown, which relates to the case in which the diver effects a decompression stage of 5 minutes at a depth of 3 meters, the diver can stay at a depth of 76 meters during 5 minutes, at a depth of 58 meters during 10 minutes, at a depth of 49 meters during 15 minutes, etc. The time is therefore simply indicated in minutes by the scale of the dial 1.

The watch such as described up to now would be theoretically already usable, but in the practice its use would be dangerous, since the diver should remember the time during which he is authorized to stay at the depth chosen and might make a mistake. In order to render the dive absolutely safe, the watch has in addition a bezel 4 with a milled edge and provided with an index 5, this bezel being rotatably mounted on the case of the watch, as well as a minute stop-hand 6 susceptible of being set in motion, stopped and returned to zero by means of a pusher 7.

The mark 2, the index 5, the numbers contained in the cartouches 3 and the end of the minute stop-hand 6 are covered with luminescent material, for allowing their reading in the darkness.

The watch described is used as follows:

Let us assume that the diver wishes to make a dive at a depth of 43 meters. It is sufficient to turn the bezel 4 so as to bring its index 5 opposite the number "43," i.e. to turn the bezel by 120° in the clockwise direction, and to set in motion the minute stop-hand 6 by actuating the pusher 7, said hand having been previously returned to zero, i.e. to "noon." The diver may effect these operations immediately before diving or when he has reached the depth desired. When the hand 6 arrives opposite the number "43," i.e. after a stay of 20 minutes, the diver is warned that he must go up again and has to effect a decompression stage at a depth of 3 meters during 5 minutes.

The following table indicates the depths and the times during which the diver can stay at these depths. In the first case (first line), no decompression stage is provided for; a decompression stage of 5 minutes at a depth of 3 meters is provided for in the second case (second line), and in the third case (third line of the table), there is provided for a decompression stage of 7 minutes at a depth of 6 meters and a decompression stage of 20 minutes at a depth of 3 meters.

TABLE

| | 5 min. | 10 min. | 15 min. | 20 min. | 25 min. | 30 min. | 35 min. | 40 min. | 45 min. | 50 min. | 55 min. |
|---|---|---|---|---|---|---|---|---|---|---|---|
| Depth in meters without d.s. | | | | 40 | 36 | 32 | 28 | 26 | 24 | 22 | 21 |
| Depth in meters with one d.s. of 5 minutes at a depth of 3 meters | 76 | 58 | 49 | 43 | 37 | 33 | 31 | 28 | 26 | 24 | 22 |
| Depth in meters with a d.s. of 7 minutes at a depth of 6 meters and a d.s. of 20 minutes at a depth of 3 meters | 91 | 79 | 64 | 55 | 49 | 43 | 35 | 33 | 31 | 29 | 27 | d.s. = decompression stage.
min. = minutes.

If the watch is adapted to control dives without any decompression stage, the cartouches 3 shall contain the numbers indicated in the first line of the above table. If the diver wishes to make a decompression stage of 5 minutes at a depth of 3 meters, he has to use a watch such as that illustrated. If he wishes to make two decompression stages, namely one of 7 minutes at a depth of 6 meters and one of 20 minutes at a depth of 3 meters, he has to use a watch in which the cartouches 3 contain the numbers set forth in the third line of the above table.

Besides the minute stop-hand 6, the watch includes two ordinary hands 8 and 9 indicating the hours and the minutes, respectively.

After a dive, the equilibrium of the pressures of the nitrogen dissolved in the organism and of the atmospheric nitrogen is progressively restored. The elimination of nitrogen in excess is slower and slower as this excess decreases and it is assumed that 6 hours are necessary for its disappearance. If a further dive is effected in this interval, the excess of nitrogen still present in the organism is added to the amount dissolved during this second dive. At the moment of going up again, the amount of nitrogen dissolved in the body will, therefore, be greater than in the case of a single dive effected at the same depth and of the same duration. The simple diving table does no longer guarantee the security and it is necessary to effect a longer decompression. There exists, for this purpose, a table for successive dives mentioning a so-called coefficient C. This coefficient is the ratio between the pressure of nitrogen dissolved in the tissues of the organism that are the slowest ones to be normalized after the return to the surface, and the pressure of nitrogen which normally exists in said tissues.

The table for successive dives gives, in function of this coefficient C, of the interval between both dives and of the depth of the second dive, an additional duration for the decompression stages, which allows to use the simple diving table. The coefficient C ranges from 1.1 to 2.0 and is indicated at 10 on the rim of the bezel 4.

What is claimed is:

1. A diver's watch comprising a watch case, a dial plate disposed in said watch case, a series of numbers including an index disposed on the periphery of said dial plate, said numbers indicating the depth at which the diver can stay during a time period corresponding to the position of each of said numbers, said time period being proportional to the angle formed between said index of the dial and each of said numbers, a bezel provided with an index, rotatably mounted on said case, and time indicating means including a minute stop-hand, whereby upon turning said bezel so as to bring its index opposite one of said numbers indicating a desired depth and the starting of said minute stop-hand, the diver is made aware of both the time the assent must begin and the stages of decompression.

2. A diver's watch according to claim 1, characterized in that the numbers indicating the depth are contained in cartouches carried by the dial.

3. A diver's watch according to claim 1, wherein said index on said dial is located at the "noon" of said dial.

4. A diver's watch according to claim 1, characterized in that the indexes, numbers and hands necessary for an easy reading in depth, are luminous.

References Cited

UNITED STATES PATENTS

| | | | |
|---|---|---|---|
| 2,564,270 | 8/1951 | McMillen | 58—126 |
| 3,111,003 | 11/1963 | Droz | 58—126 |
| 3,124,928 | 3/1964 | Brunet | 58—57 |
| 3,427,800 | 2/1969 | Blum | 58—126 |

FOREIGN PATENTS

| | | |
|---|---|---|
| 350,250 | 12/1960 | Switzerland. |
| 365,027 | 11/1962 | Switzerland. |
| 378,789 | 7/1964 | Switzerland. |
| 436,140 | 11/1967 | Switzerland. |

RICHARD B. WILKINSON, Primary Examiner

STANLEY A. WAL, Assistant Examiner

U.S. Cl. X.R.

58—152

UNITED STATES PATENT OFFICE
CERTIFICATE OF CORRECTION

Patent No. 3,475,902                                November 4, 1969

Paul Wessel

It is certified that error appears in the above identified patent and that said Letters Patent are hereby corrected as shown below:

In the heading to the printed specification, line 3, "Paul Wessel, Ronnerweg 1a, Nidau, Switzerland" should read -- Paul Wessel, Nidau, Switzerland, assignor to OMEGA Louis Brandt & Frere SA, Canton of Berne, Switzerland --. Column 3, line 25 "assent" should read -- ascent --.

Signed and sealed this 27th day of October 1970.

(SEAL)
Attest:

Edward M. Fletcher, Jr.                          WILLIAM E. SCHUYLER, J
Attesting Officer                                 Commissioner of Paten